United States Patent
Nitz

(10) Patent No.: US 11,351,017 B1
(45) Date of Patent: Jun. 7, 2022

(54) DUAL HEAD TOOTH CLEANING APPLIANCES

(71) Applicant: LaVerne Edward Nitz, Clearwater, FL (US)

(72) Inventor: LaVerne Edward Nitz, Clearwater, FL (US)

(*) Notice: Subject to any disclaimer, the term of this patent is extended or adjusted under 35 U.S.C. 154(b) by 0 days.

(21) Appl. No.: 17/497,924

(22) Filed: Oct. 9, 2021

(51) Int. Cl.
| | |
|---|---|
| *A61C 17/34* | (2006.01) |
| *A61C 17/22* | (2006.01) |
| *A61C 17/26* | (2006.01) |
| *A46B 15/00* | (2006.01) |
| *A46B 9/00* | (2006.01) |
| *A46B 5/00* | (2006.01) |
| *A46B 5/02* | (2006.01) |

(52) U.S. Cl.
CPC ............ *A61C 17/349* (2013.01); *A46B 9/005* (2013.01); *A61C 17/222* (2013.01); *A61C 17/224* (2013.01); *A61C 17/26* (2013.01); *A46B 5/0012* (2013.01); *A46B 5/0083* (2013.01); *A46B 5/021* (2013.01); *A46B 15/0008* (2013.01); *A46B 15/0036* (2013.01)

(58) Field of Classification Search
CPC ..... A61C 17/222; A61C 17/349; A61C 17/26; A61C 17/24; A61C 17/3445; A61C 17/3472; A46B 5/0083
USPC ........................................................... 15/23
See application file for complete search history.

(56) References Cited

U.S. PATENT DOCUMENTS

| | | | | |
|---|---|---|---|---|
| 2,628,377 | A * | 2/1953 | Cockriel | A61C 17/26 15/23 |
| 4,335,480 | A * | 6/1982 | Liu | A61C 17/26 15/23 |
| 7,316,044 | B1 * | 1/2008 | Nguyen | A61C 17/26 15/23 |
| 7,571,508 | B1 * | 8/2009 | Yufa | A46B 13/02 15/144.4 |
| 2016/0143718 | A1 * | 5/2016 | Serval | A46B 15/0006 15/22.1 |
| 2021/0085439 | A1 * | 3/2021 | Fishman | A61C 17/3481 |
| 2021/0093429 | A1 * | 4/2021 | Nitz | A46B 15/0046 |

FOREIGN PATENT DOCUMENTS

| | | | | |
|---|---|---|---|---|
| EP | 0103959 A1 * | 3/1984 | | A61C 17/26 |
| FR | 913810 A * | 9/1946 | | A61C 17/26 |

OTHER PUBLICATIONS

Computer generated English translation of FR913810A, Oostens, Sep. 1946. (Year: 1946).*

* cited by examiner

*Primary Examiner* — Laura C Guidotti
(74) *Attorney, Agent, or Firm* — Cygnet IP Law, P.A.; Stephen W. Aycock, II

(57) ABSTRACT

Described herein are electronic dual-head tooth cleaning appliances that facilitates simultaneous front and rear surface cleaning of individual teeth. The tooth cleaning appliances or devices can be rechargeable, portable, lightweight and electronic.

18 Claims, 6 Drawing Sheets

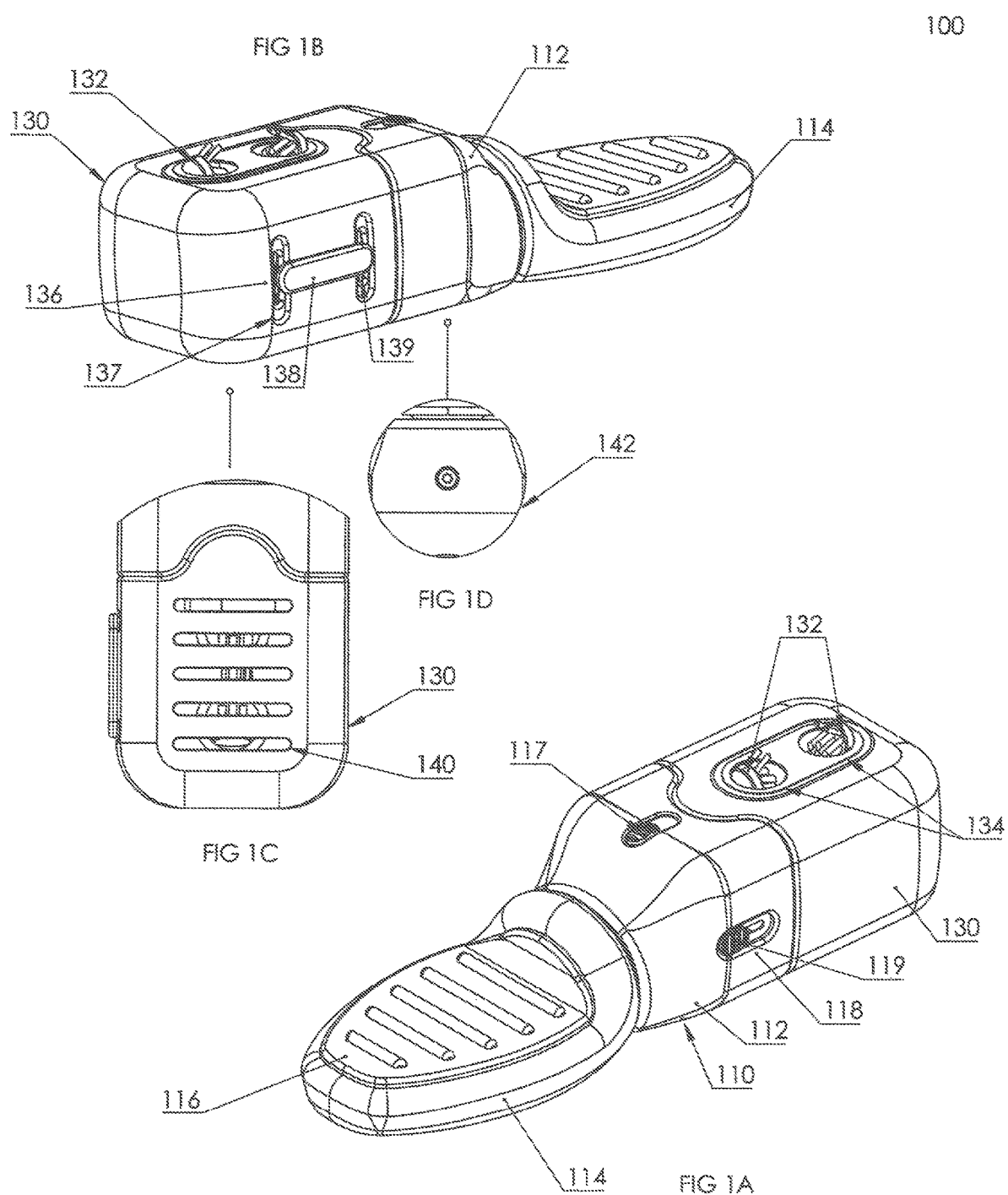

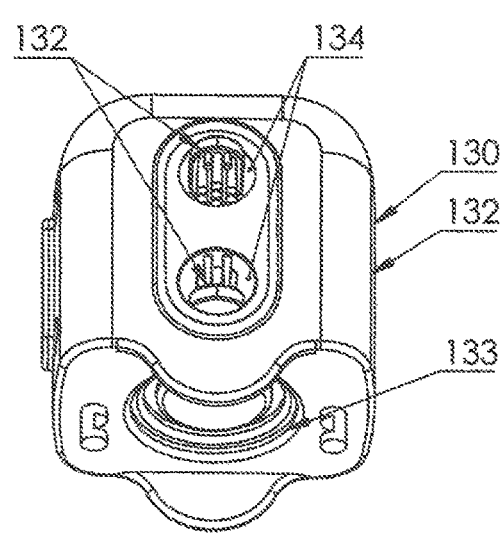
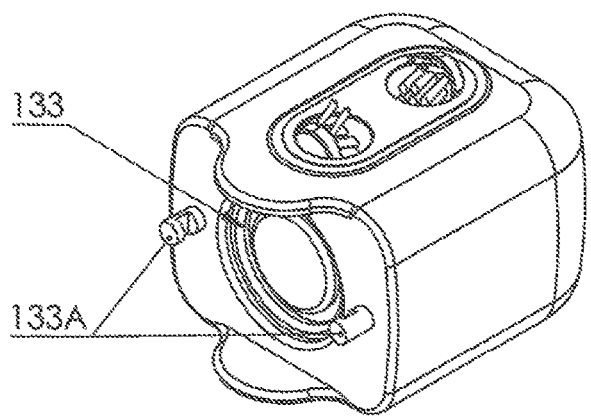
FIG 2B
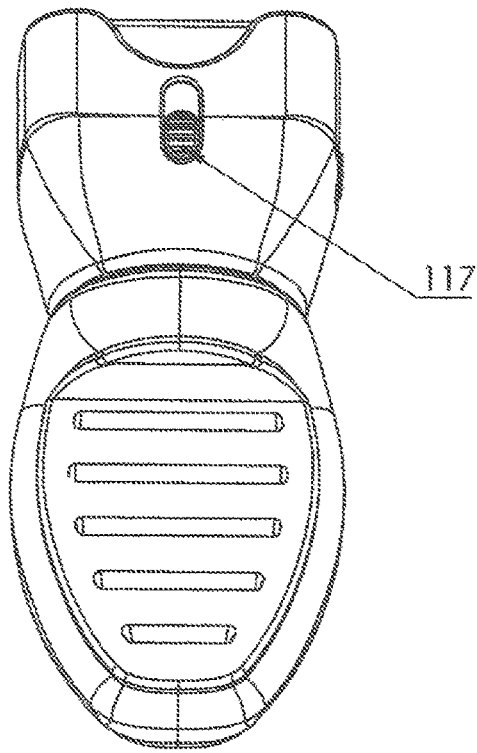
FIG 2A
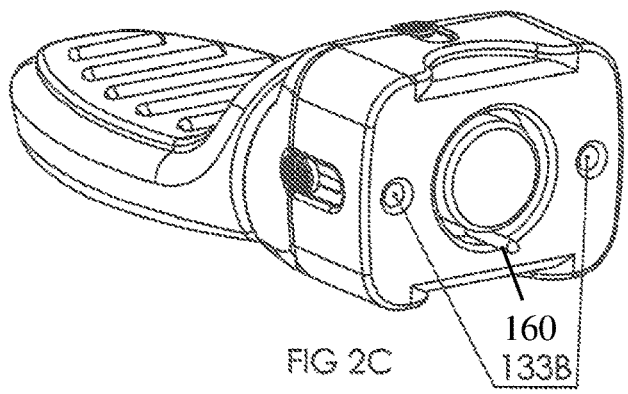
FIG 2C
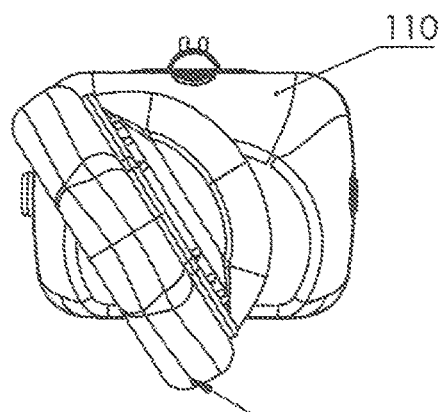
FIG 2D

DUAL HEAD TOOTH CLEANING APPLIANCES

FIELD

Some implementations relate generally to toothbrushes and, more particularly, to electromechanical toothbrushes and other tooth cleaning appliances.

BACKGROUND

Currently, there are a number of manual and electrical solutions for cleaning teeth. Manual toothbrushes may be useful for surface-cleaning a user's teeth and gums but eventually become laden with bacteria and often are not used long enough at each brushing session to be effective. Electric and electronic toothbrushes can often be more effective in terms of time and thoroughness of cleaning of teeth and gums, but the brushing motion used with some conventional electric toothbrushes may still drive food particles to the user's gums or into empty spaces between the teeth. As a back-up, and as an additional appliance for cleaning, electric toothbrushes may include an electronic water flosser designed to be better for cleaning the gums than teeth; however, such a modification increases the cost of the appliance and increases the overall size of the appliance, thereby reducing ease of handheld use and portability of the tooth cleaning appliance. Therefore, there exists a need for a tooth cleaning appliance that addresses the aforementioned challenges and disadvantages of current tooth cleaning appliances and that simultaneously cleans both sides of each tooth.

SUMMARY

Some implementations can include a tooth cleaning appliance that more effectively cleans a user's teeth and gums while being ergonomically configured for a user's hand. This appliance gently and simultaneously brushes the user's teeth on both the front and rear surfaces. In one embodiment, the tooth cleaning appliance simultaneously brushes the user's teeth with each downstroke of the bristles of the brushing heads on the upper teeth, or upward stroke of the bristles of the brushing heads on the lower teeth. In another embodiment, the tooth cleaning appliance simultaneously brushes the user's teeth with counterrotating brushes whereby the bristles brush downward on the upper teeth and upward on the lower teeth. Both exemplary embodiments prevent debris from getting pushed back into the gums and reduce the amount of brush abrasion, resulting in healthier gums and less gum recession over time. Furthermore, the present tooth cleaning appliance may be rechargeable and includes a removable and replaceable brushing section. In a related embodiment, to ensure sufficient cleaning time, the appliance may also be configured to have an internal timer set for each cleaning quadrants of a user's mouth.

One embodiment of the tooth cleaning appliance has an energy generating and transmitting module and handle assembly, the energy transmitting module including a housing having therein a motor and shaft crank arm assembly electrically connected to a power source, the housing including a power actuator located thereon configured to activate and control a speed of the motor.

BRIEF DESCRIPTION

FIGS. 1A-1D show perspective views of an example tooth cleaning appliance in accordance with some implementations.

FIGS. 2A-2D show exploded views of the example tooth cleaning appliance components in accordance with some implementations.

DETAILED DESCRIPTION

Figure 3A:
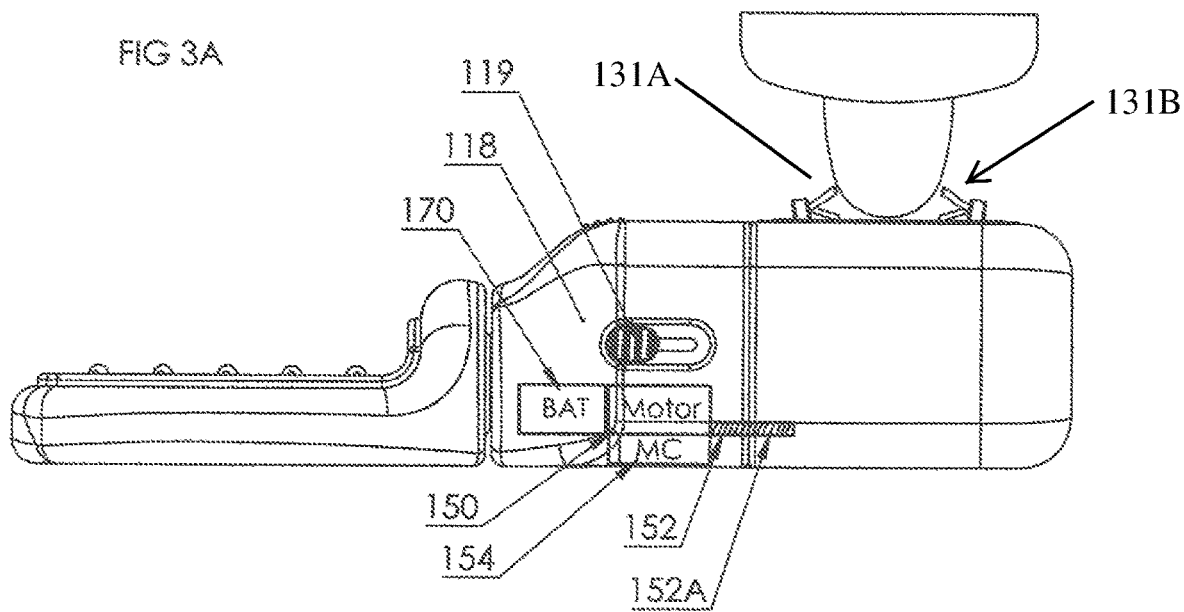
FIGS. 3A-3B show side views of the example tooth cleaning appliance with the dual-head brush module set at two different levels in accordance with some implementations.

In various embodiments of the disclosed subject matter there is provided an electronic dual-head tooth cleaning appliance having, in one embodiment, a rechargeable battery and an axially rotatable handle for case of use as well as simultaneous cleaning of a front and a rear surface of a user's teeth.

Referring now to the figures, FIGS. 1A-1D illustrate a perspective right side view of a tooth cleaning appliance 100, a left side perspective view of the tooth cleaning appliance 100 and views of a plurality of drain holes (or slots) 140 for draining fluids from the tooth cleaning appliance 100 when it is in use and a charging port 142 of the tooth cleaning appliance 100, respectively, in accordance with some implementations. In this example embodiment, the tooth cleaning appliance 100 includes a housing and handle assembly 110 having a handle housing 112 and a handle 114 extending laterally from and coupled to handle housing 112. Handle 114 includes a series of ribs or rubber padding 116 to enhance gripping and as will be discussed later, handle 114 is rotatable in an axial direction to enhance ease of use by the user. The tooth cleaning appliance 100 further includes a tooth brushing module 130 coupled laterally to handle housing 112. In this example, the tooth brushing module 130 includes a set of two or more brush heads in a dual-head brush assembly 132 protruding from apertures 134 on an upper surface of the tooth brushing module 130. Referring now to FIG. 1B there is shown a brush pressure adjustment lever 138 that slides up and down along a track 137/139 in a housing of the tooth brushing module 130. A settings display 136 is located adjacent lever 138. In addition, the housing of the energy transmitting module and housing assembly 110 includes a release button 117 to decouple the tooth brushing module from the energy transmitting module.

Figure 3B:
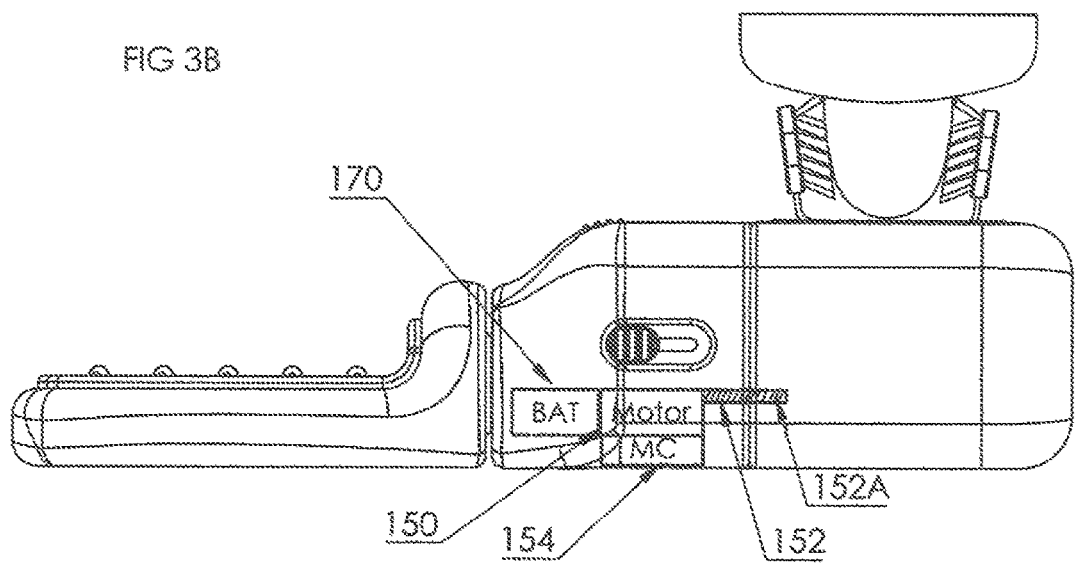

Referring now to FIGS. 2A-2D, which illustrate various exploded views, as well as internal views, of components of tooth cleaning appliance 100, and FIGS. 3A and 3B. In particular assembly 110 is an energy generating and transmitting module and handle assembly which includes handle housing 112 having therein a motor 150 and shaft crank arm assembly 152 electrically connected to a power source 170, the housing including a power actuator 119 with a speed indicator 118 located thereon to activate and control a speed of the motor 150. Shaft crank arm assembly 152 includes a drive portion 152A that protrudes from handle housing 112 at an end opposite handle 114 and which impacts a circular or radial motion upon being actuated. Module assembly 110 includes a battery 170 as a power source as well as a microcontroller 154 electrically connected to battery 170 and motor 150 for controlling shaft crank arm assembly 152. Microcontroller 154 also provides time of use capabilities for a user as a well as haptic alerts. In a related embodiment, module 110 includes an LED light to illuminate a user's teeth and is electrically coupled to the battery and controller 154. A charging port 142 is included that is coupled to battery 170 for charging.

Appliance 100 includes a removable tooth brushing module 130 coupled to housing member 110 that includes an L-shaped crank arm assembly 160 that has a proximal end coupled to drive portion 152A of shaft crank arm 152, with tooth brushing module including a dual-head brush assembly 132 protruding from an upper surface of the brushing module via apertures 134 which is coupled to a drive assembly. Dual-head brush assembly 132 imparts brush movement, in and out of the tooth brushing module 130, via mechanical interface 133, which is coupled to the drive assembly, and is responsive to movement from the module assembly 110 to provide a dual surface tooth cleaning motion on a user's teeth. The tooth brushing module 130 is secured to the module 110 via attachment points 133A when the tooth brushing module 130 is coupled to module 110.

As shown in FIGS. 3A and 3B, the dual-head brush module is adjustable to set a level that the plurality of bushes extends from the tooth brushing module 130. For example, FIG. 3A shows a first tooth brushing module level setting in which the plurality of brushes extends a first distance from the tooth brushing module. FIG. 3B shows a second tooth brushing module level setting in which the plurality of brushes extends a second distance from the tooth brushing module, where the second distance is greater than the first distance. Also, the setting of the level of the dual head toothbrush is based on a setting of a level control (e.g., 138) in accordance with a user's selection.

In operation, tooth cleaning appliance 100 cleans the front and rear surfaces simultaneously of a user's teeth by providing a set of opposing brush head members having a plurality of bristles that are directed laterally and inward to form a cleaning zone about the user's teeth. Thereafter, moving the opposing brush members in a vertical up and down direction using a motive force provided by a teeth cleaning mechanism coupled to the brush head members so as to clean a front and back surface of a user's teeth simultaneously. The cleaning operation also includes massaging and cleaning a set of gums using rubber bristles 131C/131D at an upper end of each of the brush head members 132A/132B during the vertical up and down movement.

In a related embodiment, tooth cleaning appliance comprising a hosing and handle assembly, the housing having herein a motor and shaft crank arm assembly electrically connected to a power source, the housing including a power actuator located thereon configured to activate and control a speed of the motor, wherein the shaft crank arm includes a drive portion that protrudes laterally from the housing at an end opposite a handle member and which imparts an axial motion upon being actuated. The appliance includes a removable tooth brushing module coupled to the housing member that includes a crank arm linkage assembly that has a proximal end coupled to the drive portion of the shaft crank arm, the teeth bushing module including a brush assembly protruding from an upper surface of the brushing module and coupled to a distal end of the crank arm linkage assembly, wherein the brush assembly imparts a vertical movement in and out of the brushing module responsive to the linkage assembly movement to provide a dual surface tooth cleansing motion on a user's teeth.

Figure 4:
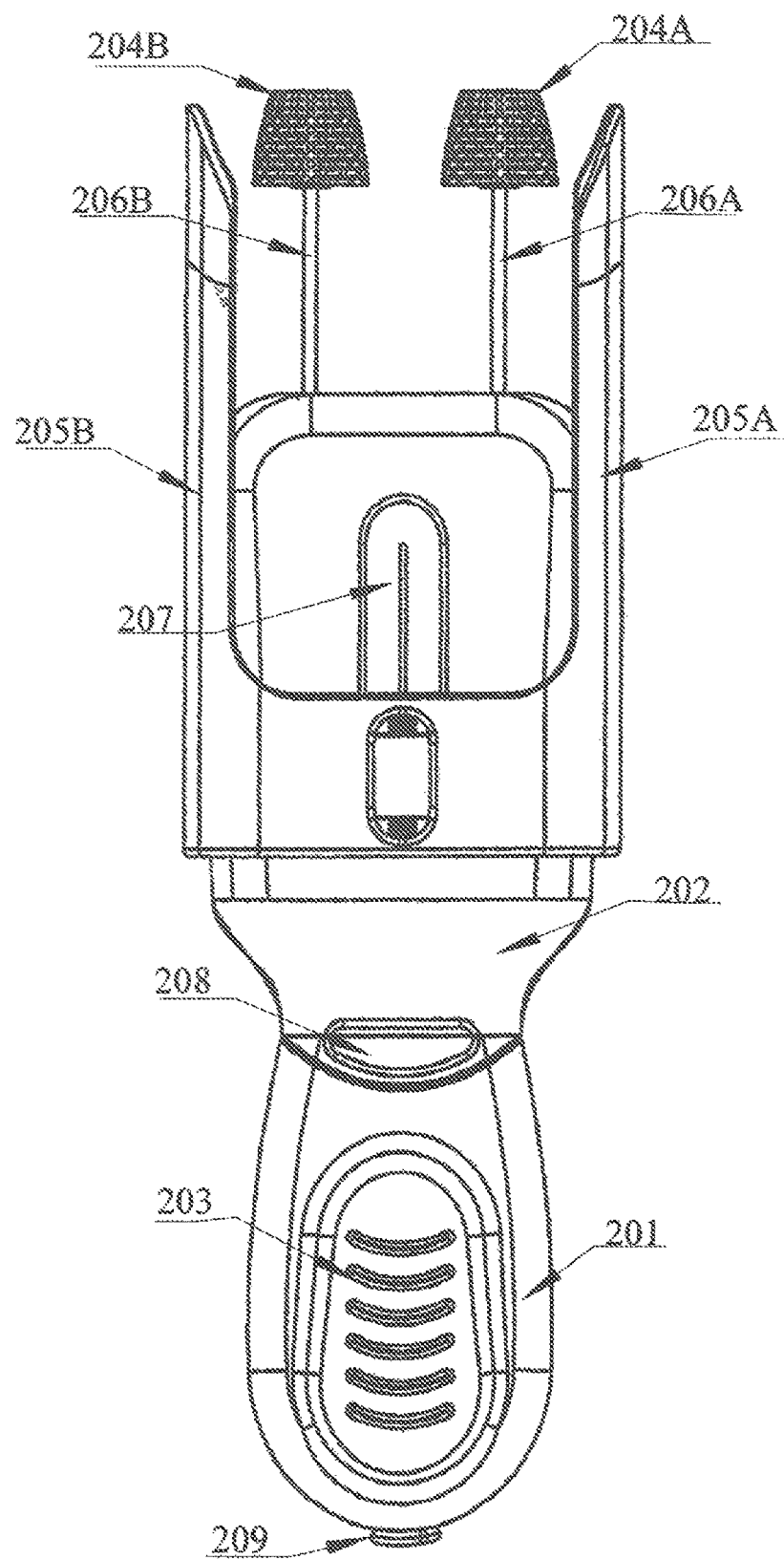
FIG. 4 is a front view of an example tooth cleaning appliance in accordance with some implementations.
Figure 5:
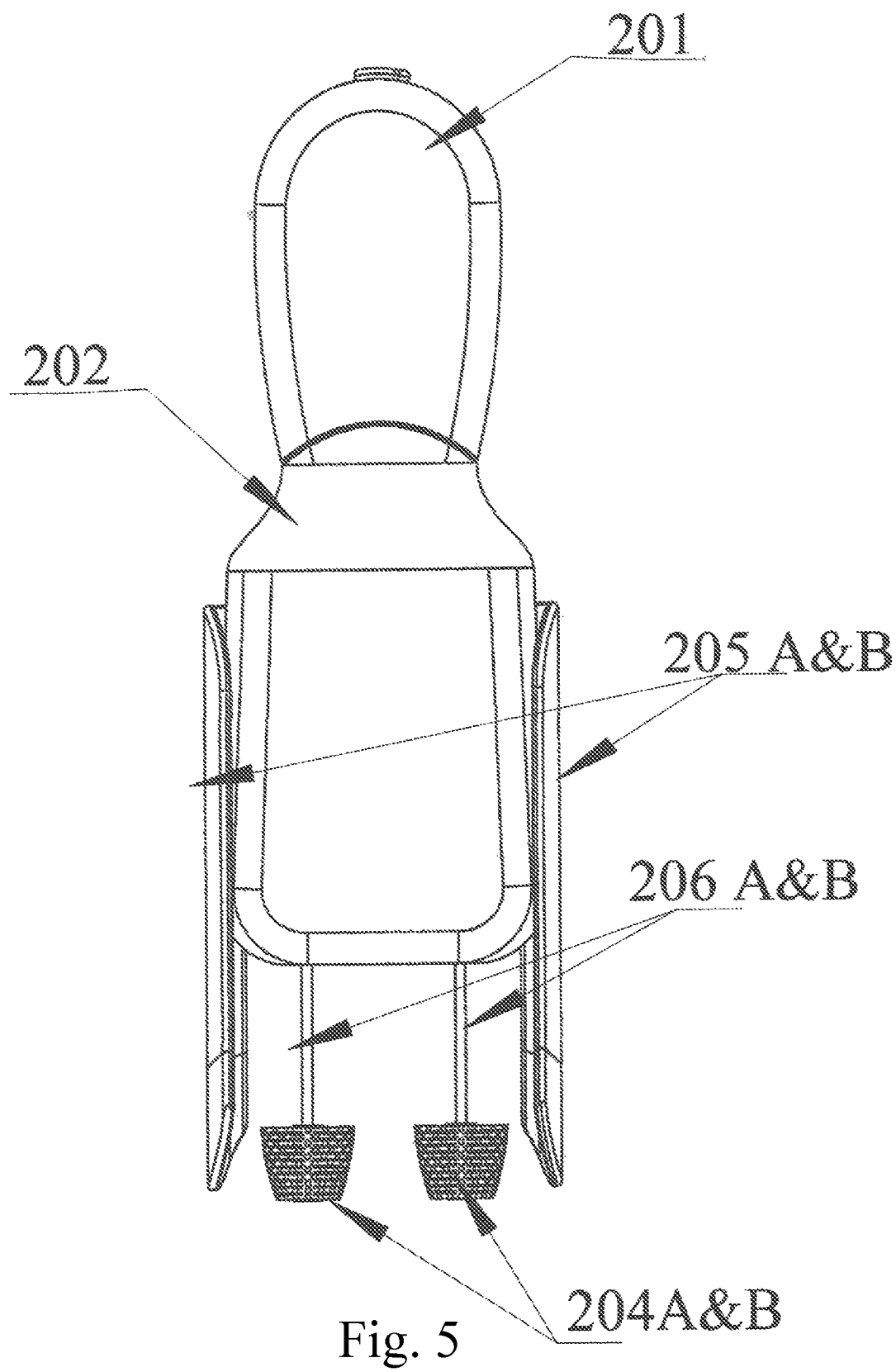
FIG. 5 is a back view of an example tooth cleaning appliance of FIG. 4 in accordance with some implementations.

FIGS. 4 and 5 show front and rear views, respectively, of an example tooth cleaning appliance 200 in accordance with some implementations. The tooth cleaning appliance 200 includes a handle and housing assembly 202 that includes a handle 201 that is coplanar with dual cleaning heads 204A and 204B. The handle 201 can include a ribbed gripping area 203.

The tooth cleaning appliance 200 includes dual cheek guards 205A and 205B. The dual cleaning heads include shafts 206A and 206B that connect to a drive assembly (see, FIGS. 6A-6B) at a proximate end and have the cleaning heads 204A and 204B at a distal end. The shafts 206A and 206B are formed from a material (e.g., metal or strong plastic) that provides adequate tensile strength to reduce or prevent the cleaning heads from "whipping around" on the shafts. The shafts 206A and 206B need to be flexible enough to bend some, but not so flexible as to whip around when the tooth cleaner is in operation.

A height adjustment selector 207 is provided that permits a user to adjust the height or distance that the cleaning heads and/or cheek guards extend from the tooth cleaning appliance. A power switch 208 couples an electric motor to a power source and permits a user to control the on/off operation of the motor. An optional charging port 209 is electrically coupled to the power source (e.g., a rechargeable battery) to provide power to the tooth cleaning appliance and/or to recharge the power source.

Figures 6A, 6B, 6C:
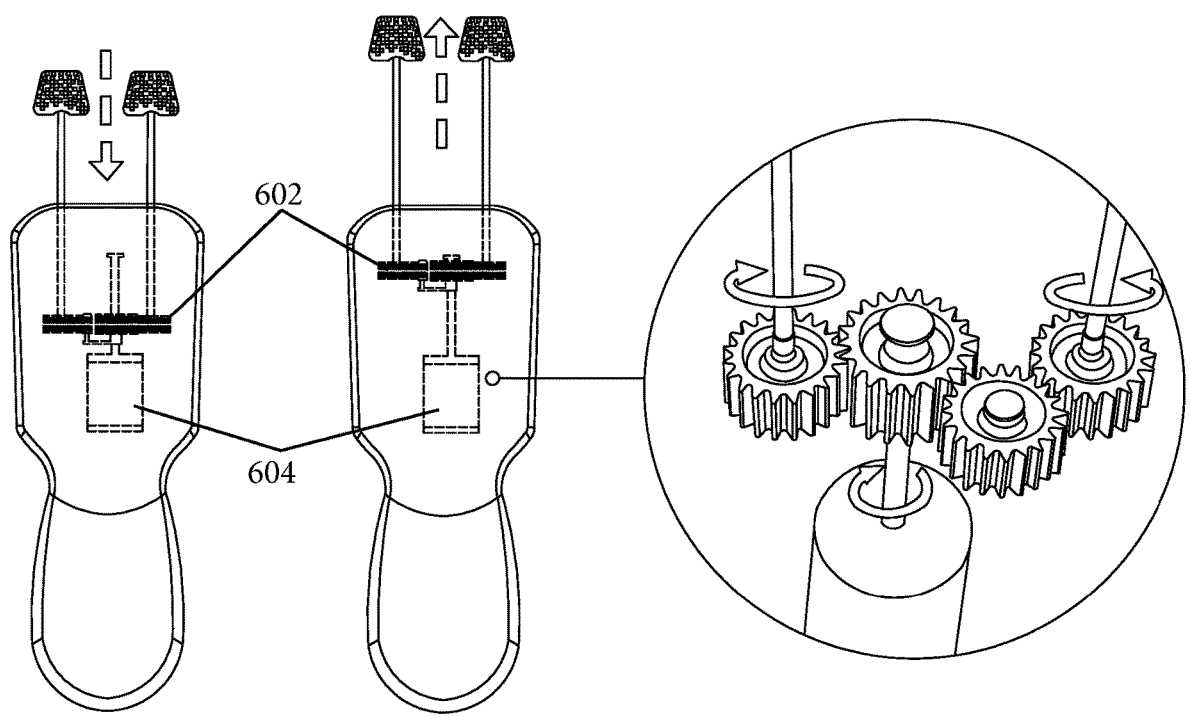
FIG. 6A shows a view of the example tooth cleaning appliance of FIG. 4 with the rotating cleaning heads in a first position in accordance with some implementations.
FIG. 6B shows a view of the example tooth cleaning appliance of FIG. 4 with the rotating cleaning heads in a second position in accordance with some implementations.
FIG. 6C shows a detail view of the gearing of the rotating cleaning heads of the example tooth cleaning appliance of FIG. 4 in accordance with some implementations.

FIG. 6A shows a view of the example tooth cleaning appliance 200 of FIG. 4 with the rotating cleaning heads 204A/204B in a first position with the cleaning heads extended a first distance from the handle and housing assembly.

FIG. 6B shows a view of the example tooth cleaning appliance of FIG. 4 with the rotating cleaning heads in a second position with the tooth cleaning heads extended a second distance from the handle and housing assembly, where the first distance is different than the second distance (in this case, the second distance is greater than the first distance).

FIGS. 6A and 6B show that the cleaning heads, the cheek guards, the electric motor and the drive assembly can all be moved positionally in response to the height adjustment selector. It will be appreciated that movement of the motor, drive assembly, and cheek guards in response to the height adjustment selector is optional and that some implementations can include movement of the cleaning heads in response to the height adjustment selector along with none or more of the motor, drive assembly, and cheek guards.

FIG. 6C shows a detail view of the electric motor and drive assembly providing counter rotating movement of the rotating cleaning heads of the example tooth cleaning appliance 200 of FIG. 4 in accordance with some implementations.

In related embodiments, tooth cleaning appliance includes the brush assembly which is selected from the group consisting of a set of elongate brush heads, a set of rotary-style bristle brush heads, and a set of elongate sponge heads. In one embodiment, the handle and housing assembly includes an LED light on an upper surface co-planar with the brush assembly and in another example the handle and housing assembly includes an electronic module with a microcontroller to provide time of use alert with a haptic vibration device or an LED light.

In a related embodiment, rechargeable batteries are replaced with standard non-rechargeable batteries. In another related embodiment, the toothbrush heads are individually replaceable and include fading color dyes indicating the time to change the cleaning head. In yet another embodiment, the cleaning appliance is applicable to cleaning dentures or other mouthpieces or removal dental implants or fixtures.

While the disclosed subject matter has been described above in terms of specific embodiments, it is to be understood that the disclosed subject matter is not limited to these embodiments. Upon reading the teachings of this disclosure many modifications and other embodiments of the disclosed subject matter will come to mind of those skilled in the art to which the disclosed subject matter pertains, and which are intended to be and are covered by both this disclosure and the appended claims. It is indeed intended that the scope of the disclosed subject matter should be determined by proper interpretation and construction of the appended claims and their legal equivalents, as understood by those of skill in the art relying upon the disclosure in this specification and the attached drawings.

What is claimed is:

1. A tooth cleaning appliance comprising:
   a handle;
   an energy generating and transmitting module releasably coupled to the handle at a first end of the energy generating and transmitting module, the energy generating and transmitting module including a housing having therein a motor and shaft crank arm assembly electrically connected to a power source, the housing including a power actuator located thereon configured to activate and control a speed of the motor, wherein the shaft crank arm includes a drive portion that protrudes from the module housing at a second end opposite the first end, wherein the drive portion imparts a circular or radial motion upon being actuated; and
   a tooth brushing module releasably coupled to the second end of the module housing, wherein the tooth brushing module includes a dual-head brush assembly having a plurality of brushes protruding from an upper surface of the tooth brushing module and a drive section that mechanically couples the dual-head brush assembly to the shaft crank arm to impart motion to the plurality of brushes of the dual-head brush assembly, wherein the dual-head brush assembly is vertically adjustable within the tooth brushing module to permit the plurality of brushes to extend from the tooth brushing module an adjustable distance, and wherein the plurality of brushes of the dual-head brush assembly provide a dual surface tooth cleaning motion on a user's teeth when the tooth cleaning appliance is in use,
   wherein the dual-head brush assembly within the tooth brushing module includes the plurality of brushes partially located within a brush assembly support frame in a brush assembly housing, wherein the brush assembly support frame includes a support plate with a set of pivoting stopper arms located on distal ends of the support plate such that the set of pivoting stopper arms form a channel for vertical movement of the plurality of brushes, each one of the plurality of brushes having resilient extensions protruding therefrom that are both coupled at a distal end to a spring steel strip, the spring steel strip configured to provide a compression force on the resilient extensions and against the stopper arms to widen a brush gap between the plurality of brushes with each upward movement of an L-shaped crank arm.

2. The tooth cleaning appliance of claim 1, wherein the tooth brushing module includes a pressure adjustment actuator configured to change the brush gap between plurality of brushes through a plurality if settings, a low setting for larger teeth wherein the brush assembly support frame is lowered within the brushing module and a high setting for narrower teeth wherein the brush assembly support frame is raised within the tooth brushing module and protrudes further from the upper surface of the tooth brushing module.

3. The tooth cleaning appliance of claim 1, wherein each of the plurality of brushes includes rubber bristles on an upper end configured to massage and clean a user's gums.

4. The tooth cleaning appliance of claim 1, wherein the handle is configured to pivot or rotate axially.

5. The tooth cleaning appliance of claim 1, wherein the tooth brushing module includes a series of fluid draining holes at a surface opposite the plurality of brushes.

6. The tooth cleaning appliance of claim 1, wherein the housing of the energy generating and transmitting module includes a release button to decouple the tooth brushing module from the energy generating and transmitting module.

7. The tooth cleaning appliance of claim 1, wherein each of the plurality of brushes having bristles protruding laterally towards each other to perform a front and rear surface cleaning a user's tooth.

8. The tooth cleaning appliance of claim 1, wherein the handle includes a ribbed gripping surface.

9. A tooth cleaning appliance comprising:
   a housing and handle assembly including a handle, an electric motor electrically connected to a power source via a power switch, a drive assembly mechanically coupled to the motor, cheek guards, and a height adjustment selector; and
   a plurality of cleaning heads mechanically coupled to the drive assembly at a proximate end of each cleaning head and configured to rotate when the electric motor is activated, and having tooth cleaning members at a distal end of each cleaning head,
   wherein the height adjustment selector adjusts a distance that the plurality of cleaning heads extends from the housing and handle assembly, and
   wherein the cheek guards adjust in position in response to the height adjustment selector.

10. The tooth cleaning appliance of claim 9, wherein the plurality of cleaning heads includes two cleaning heads that are counter rotating.

11. The tooth cleaning appliance of claim 9, wherein the electric motor and the drive assembly adjust position in accordance with the height adjustment selector.

12. The tooth cleaning appliance of claim 9, wherein the tooth cleaning members are selected from a set of rotary-style bristle brush heads and a set of rotary-style sponge heads.

13. The tooth cleaning appliance of claim 9, wherein the handle and housing assembly includes an LED light co-planar with the handle and housing assembly.

14. The tooth cleaning appliance of claim 9, wherein the handle and housing assembly includes an electronic module with a microcontroller to provide time of use alert with a haptic vibration device or an LED light.

15. The tooth cleaning appliance of claim 9, wherein the handle and the cleaning heads are coplanar.

16. The tooth cleaning appliance of claim 9, wherein the handle includes a ribbed gripping surface.

17. The tooth cleaning appliance of claim 9, wherein the power source is a rechargeable power source, and the handle and housing assembly includes a charging port electrically coupled to the power source.

18. The tooth cleaning appliance of claim 17, wherein the charging port is disposed on a distal end of the handle.

\* \* \* \* \*